Patented Feb. 12, 1929.

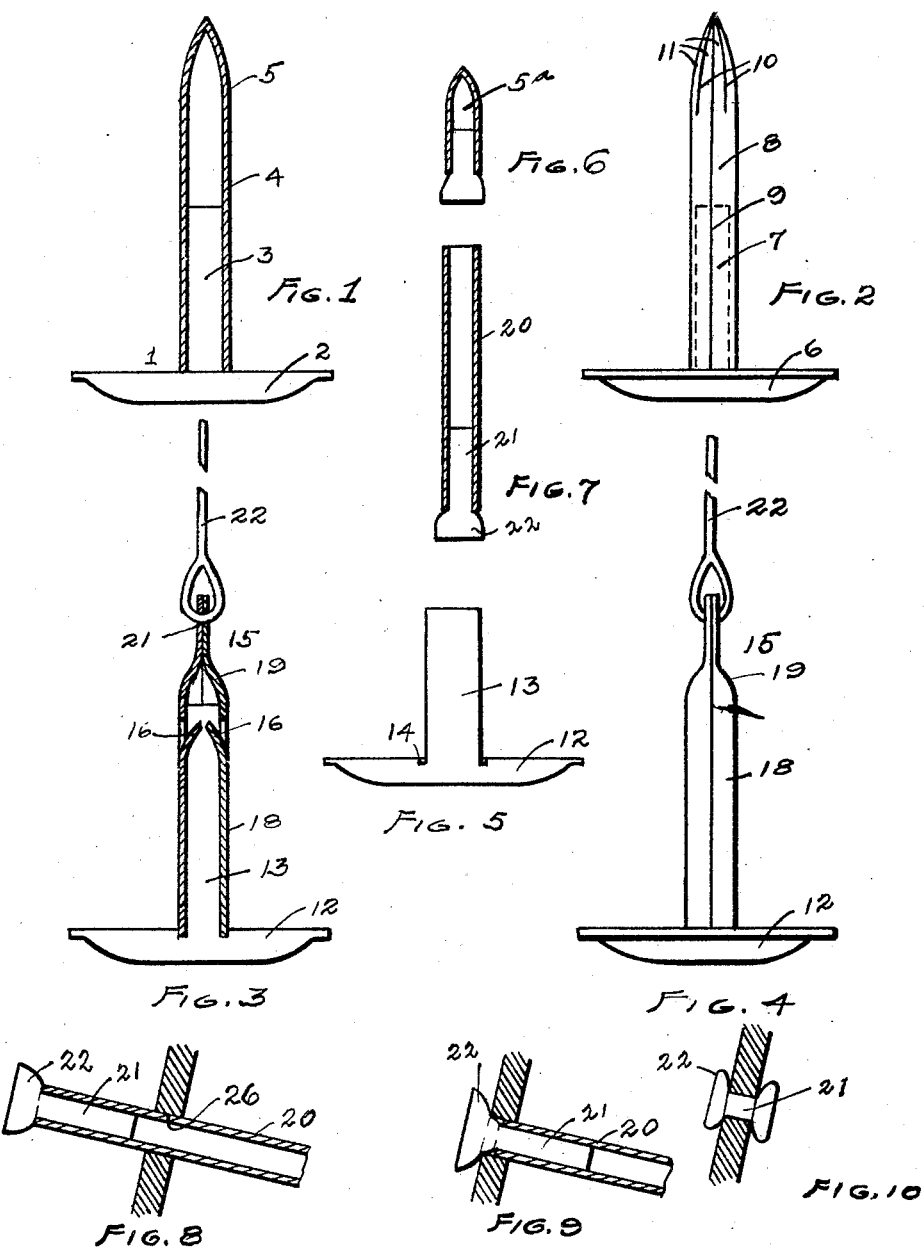

1,702,031

UNITED STATES PATENT OFFICE.

WILLIAM J. WESSELER, OF EAST CLEVELAND, OHIO, ASSIGNOR TO KEX COMPANY, INCORPORATED, OF ST. LOUIS, MISSOURI, A CORPORATION OF MISSOURI.

APPARATUS FOR LEAK STOPPERS AND THE LIKE.

Application filed December 5, 1927. Serial No. 237,906.

This application is a continuation in part of my application Serial No. 224,746, filed October 7, 1927, which matured into Patent No. 1,681,829, August 21, 1928.

This invention as indicated relates to an apparatus for leak stoppers and the like. More particularly it comprises an apparatus forming an individual self-contained unit including a plug having a head to which is united an elastic stem portion which stem is maintained in narrowed and elongated condition closely approaching its normal limit of elasticity by means of a substantially rigid confining member which may be designated a sleeve, shield, or cap, and which may be inserted through a puncture aperture with practically no resistance, by pressure on the base of the plug, rather than through a pull on the end of the rigid member by means of pliers or other implement. In some instances pliers may be resorted to as hereinafter explained, but the invention contemplates in addition the provision of a device making unnecessary the use of pliers or other implements at any stage of the operation, to insert the plug stem or to remove the cap or shell. It also includes a means of repairing punctures which is adapted for sealing apertures in articles made of rigid non-elastic material such as metal receptacles as well as articles made of resilient material such as tire casings and the like, in that the elongation and narrowing of the sealing stem is carried to such degree that it may be passed through the puncture aperture without expanding the same and thereafter seat the stem in position and release the same into effective sealing engagement solely by reason of the elasticity of the plug stem.

Heretofore it has been the practice to insert resilient stems of mushroom shaped plugs through the tire casings from within the same to seal puncture holes formed through said casings by means of inserting implements of needle-like shape provided with a tapered terminal at one end and a socket of a size adapted to receive the stem of the plug at the opposite end. In using such devices the walls of the puncture aperture are expanded through engagement with the tapered end of the inserting instrument and in some instances the stem of the plug is elongated and reduced in diameter to a certain extent during the course of insertion through the puncture hole. In other instances the stem of the plug is frictionally engaged within a socket at the end of the tapered inserting implement being somewhat elongated but not materially reduced in transverse diameter and said tapered implement with the enclosed stem is then inserted in the puncture aperture and engaged in puncture sealing position, through the release of the what may be termed "compression" on the walls of the puncture aperture by the withdrawal, exteriorly of the tire casing, of the inserting implement. It has been proposed to affix a cap or inserting implement to the end of a plug in clamping engagement therewith to facilitate the introduction of the same within an aperture through a tire casing, but no material elongation and narrowing of the plug stem have been in view, the primary object being to firmly engage the cap with the stem to permit a pull on the end of the same, rather than the insertion of the stem without appreciable resistance through the puncture aperture by pressure on the head of the plug.

So far as the prior art reveals it has not heretofore been proposed to elongate the elastic stem of a puncture plug to substantially its limit of normal elongation and to engage the stem while so elongated within a substantially rigid confining member whereby the reduced diameter of the stem would be maintained and a device provided which might be inserted within the puncture aperture without expanding the puncture hole sufficiently to provide a gripping engagement in that manner with the stem of the plug, and, after passing the plug through such puncture aperture under a high degree of elongation, to release the stem of the plug from such condition whereby the stem of the plug would tend to return to its normal diameter and completely fill the puncture aperture.

The present invention therefore has in view primarily the reduction of the diameter of an elastic plug stem to a size materially less than its normal diameter and preferably approaching the greatest possible reduction in size without changing the structure of the material of the plug and thereafter releasing said plug stem to permit it to return so far as possible to its normal diamater and interengage with the adjacent walls of the puncture hole and be maintained in such interengaged position substantially entirely by reason of the elasticity of the stem portion of the device and irrespective of the gripping action of the adjacent walls of the puncture opening.

In addition to use as a puncture sealing device in a structure having resilient walls, such as a tire casing, the device is especially adapted for use in another field which may not be satisfactorily fulfilled by means of repair devices heretofore used for tire casing repair, in that it may be used as a leak stopper by being engaged through apertures in rigid members such as metal receptacles, the walls of which could not be resiliently expanded and by virtue of the high degree of elongation, and narrowing of the stem, permit the confining member to readily pass through said aperture, and after withdrawal from the stem, to permit said stem to completely fill the puncture aperture and tightly grip the adjacent walls of the puncture opening. To the accomplishment of the foregoing and related ends, said invention, then, consists of the means hereinafter fully described and particularly pointed out in the claims.

The annexed drawing and the following description set forth in detail certain means of carrying out the invention, such disclosed means illustrating, however, but one of various ways in which the principle of the invention may be used.

In said annexed drawing:

Fig. 1 is a view partially in section showing the preferred form of a tire casing repair plug embodying the principles of my invention; Fig. 2 is a side elevation of a tire casing repair plug provided with a rigid inserting member engaged over the stem thereof, said rigid member being formed of sheet metal bent to tubular form; Fig. 3 is a central vertical sectional view showing a further modified form of device for engaging over and shielding the resilient stem of a tire casing repair plug and interlockingly engaging with said stem; Fig. 4 is a side elevation of the device shown in Fig. 3; Fig. 5 is a side elevation of the modified form of plug illustrated in Figs. 3 and 4; Fig. 6 is a view similar to Fig. 1 showing a plug of normally uniform diameter, suitable for use in repairing tire casings and the like; Fig. 7 is a sectional view of a device suitable to be used as a leak stopper, tire casing repair device and the like; and Figs. 8, 9, and 10, are views partly in section showing the successive stages of using the device shown in Fig. 7, as a leak stopper.

As is clearly shown in Fig. 1 of the drawing, a tire casing repair plug 1 preferably formed of elastic rubber and having a head section 2 and elastic stem section 3 is engaged within a tubular member 4 adapted to frictionally engage with the sides of the plug stem to hold said stem compressed or deformed, and having a tapered portion 5 adapted to act expansively upon the walls of the puncture aperture. The device shown in Fig. 1 may be formed of a tubular member of an internal diameter less than normal diameter of the plug stem and said plug stem may be engaged within said tubular member, by means of a cord or wire or through the use of suction or pressure, or suction and pressure applied through suitable apparatus forming no part of the present invention. Said plug stem when so engaged is elongated and narrowed and when relieved from the inserting force enlarges to engage said member with a degree of friction adequate to prevent the accidental displacement of said inserting instrument from said stem and to narrow and elongate said stem. The tubular member is provided with a tapered portion which may be formed preliminary to the engagement of the plug stem within the same, a small opening being provided adjacent the tapered end, but is preferably tapered after the stem is so engaged and said member is preferably drawn to a sharp point which serves to hermetically seal the plug stem within the tubular member, and form what may be designated a vacuum plug in that a sharp report will occur as the tubular member is removed after the plug is in position. If the air is partially exhausted in the tip $5^a$ of the tubular member (see Fig. 6) prior to and during the sealing operation, this effect will be enhanced.

In the form of construction shown in Fig. 2, the repair plug is provided with a head 6 and stem 7, which stem is engaged within an inserting member 8 formed of thin sheet metal of adequate strength which may be first formed to tubular shape, the plug stem thereafter being drawn into position, or which may be rolled about said stem to frictionally engage and elongate the same or which may be clampingly engaged with said stem while said stem is elongated, the edges of said tubular sheet meeting along a longitudinal line 9 extending along one side of the said member. The sheet at its free end is provided with a series of slots 10 providing tapered points 11 which when pressed together will meet and form a tapered terminal at the free end of said inserting member.

In the form of construction illustrated in Figs. 3, 4, and 5, a modified form of plug is used, said plug having a head section 12 and a stem section 13, the head section being provided with an annular recess 14 at the base of said stem section for a purpose to be presently disclosed. Said stem section 13 is formed of elastic material and an inserting device 15 formed in two sections of substantially semi-circular cross-section is adapted to be engaged over the same and held in position through the engagement of prongs 16 on each section of said engaging device, and the reception of the lower end 17 of said device within the annular recess 14 heretofore mentioned. The inserting member as indicated is formed of two complementary sections of substantially semicircular cross-section and of substantially cylindrical shape when in aligned position adjacent their lower portion 18 and providing a tapered portion 19 adjacent their upper ends. The upper ends of said sections are provided with aligned perforations 21 through which a wire or similar element 22 is engaged. The wire is looped through the aligned apertures and permits the separation of the members to receive the elastic stem of the puncture plug within the same. Adjacent the tapered portion of said sections an inwardly projecting prong or tooth 16 is provided having a sharpened end adapted to engage into the soft material of the puncture plug stem. The plug stem may be turned angularly to engage with the prongs, and the sections of the inserting member then held pressed together and the stem of the plug elongated a sufficient distance to permit the same to pass between the edges of the sections and then relieved of some of the elongating tension until the lower ends of the sections are received within the annular recess about the plug stem. The plug stem may also be engaged with one of the sections of the implement and thereafter the other section may be engaged. The device when assembled upon the stem of the plug will thus be held in frictional as well as interlocking engagement with said stem and is ready for use for insertion through a puncture aperture through a tire casing.

The manner of repairing a puncture, it is believed, will be obvious from the description of the construction of the several repair devices above set forth. It may be stated, however, that when a repair device of the type shown in Figs. 1, 2, and 3, is used, a stem of a size to pass easily through the aperture is selected and the cap removed after it is positioned within the aperture, but if it is desired to use both the compression of the tire casing walls and the elasticity stored in the plug stem, an enclosed stem of larger size is selected and the pointed end of the inserting member is engaged through the puncture aperture and forced therethrough until the end of the inserting member may be grasped exteriorly of the tire casing. During this operation the tapered portion of the shield or inserting member will act expansively against the walls of the puncture aperture and the resilient stem engaged within said member in narrowed and elongated condition will be drawn into a puncture sealing position. The inserting member may then be removed by drawing the same outwardly of the tire casing and thus releasing the stem of said plug and the walls of the tire casing into interlocking engagement.

When a device of the character illustrated in Figs. 4 and 5 is employed, the wire terminal at the end of the inserting member is engaged through the puncture aperture and if a large size of enclosed stem has been selected it may then be seized by pliers or similar instrument exteriorly of the tire casing and drawn outwardly to engage the tapered portion of the inserting member with the walls of the puncture aperture to enlarge the same and permit the inserting implement and the enclosed plug stem in narrowed and elongated condition to be drawn through said aperture. As the head of the plug bears against the inner walls of the tire, the pull upon the wire terminal is continued until the plug stem is elongated and the lower edges of the inserting terminal are drawn through the puncture aperture when the same will spring apart and release the plug stem into interlocking relation with adjacent walls of the puncture aperture.

In place of providing a tapered end on the sleeve, the means for holding the stem narrowed or elongated may comprise a tubular member of small diameter which is cylindrical throughout its length and terminates in a squared-off end similar to the base of the tube against which the head of the plug rests. This construction is made possible by the fact that with a suitable quality of elastic stem it has been found possible to elongate the stem without injuring the structure of the same, a distance of over three or four times the normal length of the stem thereby reducing its transverse diameter to more than one-half or one-third of its original diameter so that the diameter of the plug stem with the thickness of the enclosing sleeve would be substantially one-half, or even less than one-half of the normal diameter of the stem of the plug alone in its normal condition.

In the form of construction shown in Fig. 7, the cylindrical shell 20 is filled for a portion of its length only, with the elastic member 21 and a small portion 22 of said elastic member projects beyond the lower end of said shell. The device illustrated in Fig. 7 may be used in the manner shown in Figs. 8, 9 and 10. In Fig. 8 there is shown the introduction of the cylindrical shell through an aperture 26 in the side of a pail or similar vessel, said aperture being of a size to just permit the passage of said shell but being insufficient to permit the projecting end of the elastic member to pass therethrough. Accordingly when the end 22 of said member engages the inner wall of the pail adjacent the hole, the projecting portion will be gripped by the side walls of the opening and the remaining portion of the elastic member will be drawn from the shell. When so withdrawn, the elastic member will assume approximately the form shown in Fig. 10, the ends of said elastic member expanding to form what may be termed buttons at either side of the hole through the vessel.

The method of carrying out a part of this invention comprises the steps of providing a relatively rigid confining member of a diameter less than the diameter of the puncture or other aperture, engaging an elastic member or stem of a plugging member of a normal diameter greater than said aperture within said confining member, passing said confining member and enclosed stem within said aperture without acting expansively against the walls thereof, and drawing or releasing said confining member from the stem to allow said stem to enlarge and seal the aperture. It also includes the step of elongating an elastic member to substantially its normal limit of elongation and maintaining substantially said elongation until said member is positioned within an aperture to be plugged, and then releasing said confining member from said elastic member to allow it to close said aperture.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A repair device forming an individual self-contained unit comprising a rubber plug having a head section and an elastic stem section, and a relatively rigid member engaged over said stem section and maintaining said stem section in narrowed and pre-elongated condition preliminary to insertion in a puncture aperture.

2. A repair device forming an individual self-contained unit comprising a rubber plug having a head section and a solid elastic stem section, and a metal sleeve engaged over the entire stem section and maintaining said entire stem section in narrowed and pre-elongated condition preliminary to insertion in a puncture aperture.

3. A repair device forming an individual self-contained unit comprising a rubber plug having a head section and an elastic stem section, and means shielding said entire stem section and maintaining said entire stem section in narrowed and pre-elongated condition preliminary to insertion in a puncture aperture.

4. A repair device forming an individual self-contained unit comprising a disk-like head member and an elastic deformable stem secured thereto and a relatively rigid casing surrounding said stem and holding the same in narrowed pre-elongated condition.

Signed by me this 1st day of December, 1927.

WILLIAM J. WESSELER.